(12) United States Patent
Karabacak

(10) Patent No.: US 10,677,669 B2
(45) Date of Patent: Jun. 9, 2020

(54) OPTICAL SENSOR DEVICE WITH ENHANCED SHOCK ABSORPTION

(71) Applicant: Fugro Technology B.V., Leidschendam (NL)

(72) Inventor: Devrez Mehmet Karabacak, Leidschendam (NL)

(*) Notice: Subject to any disclaimer, the term of this patent is extended or adjusted under 35 U.S.C. 154(b) by 142 days.

(21) Appl. No.: 15/757,730

(22) PCT Filed: Sep. 7, 2016

(86) PCT No.: PCT/NL2016/050621
§ 371 (c)(1),
(2) Date: Mar. 6, 2018

(87) PCT Pub. No.: WO2017/043968
PCT Pub. Date: Mar. 16, 2017

(65) Prior Publication Data
US 2019/0049325 A1    Feb. 14, 2019

(30) Foreign Application Priority Data

Sep. 7, 2015  (NL) .................................. 2015406

(51) Int. Cl.
*G01L 1/24* (2006.01)
*G01H 9/00* (2006.01)
(Continued)

(52) U.S. Cl.
CPC ............ *G01L 1/243* (2013.01); *G01D 5/3538* (2013.01); *G01H 9/004* (2013.01); *G01V 1/208* (2013.01); *G02B 6/02* (2013.01)

(58) Field of Classification Search
CPC ......... G01L 1/243; G01L 1/242; G01L 1/247; G01D 5/3538; G01H 9/004; G01V 1/208;
(Continued)

(56) References Cited

U.S. PATENT DOCUMENTS 4,515,473 A * 5/1985 Mermelstein ........... G01L 1/243
                                                       356/33
6,269,198 B1    7/2001 Hodgson et al.
(Continued)

FOREIGN PATENT DOCUMENTS

CA    2921215 A1    2/2015
CN    1111391 A    11/1995
(Continued)

OTHER PUBLICATIONS

International Search Report and Written Opinion; PCT No. PCT/NL2016/050621; dated Nov. 8, 2016.
(Continued)

*Primary Examiner* — Lisa M Caputo
*Assistant Examiner* — Rose M Miller
(74) *Attorney, Agent, or Firm* — Polsinelli PC

(57) ABSTRACT

The present invention discloses an optical sensor device, comprising: an optical fiber; a transducer; and an intrinsic fiber optic sensor embedded in the optical fiber;
wherein the transducer is arranged as to receive an input action and converting such input action into a proportional strain on the intrinsic fiber optic sensor being at least the transducer and the intrinsic fiber optic sensor enclosed by a housing being the housing filled either with a thermally-responsive substance or a pressure-responsive substance being such device characterized in that the substance is a substance whose viscosity is reduced by at least 70% upon the change from ambient conditions to working conditions.

20 Claims, 2 Drawing Sheets

(51) Int. Cl.
*G01D 5/353* (2006.01)
*G01V 1/20* (2006.01)
*G02B 6/02* (2006.01)

(58) Field of Classification Search
CPC ...... G02B 6/02; G01N 29/227; G01N 29/228; G01N 29/2418; G01N 21/1702
USPC .................................................. 73/649, 643
See application file for complete search history.

(56) References Cited

U.S. PATENT DOCUMENTS

| | | |
|---|---|---|
| 2005/0174887 A1 | 8/2005 | Nash et al. |
| 2010/0083749 A1 | 4/2010 | Cour |
| 2010/0260013 A1 | 10/2010 | Bedwell |
| 2012/0222487 A1 | 9/2012 | Hill et al. |
| 2014/0036635 A1 | 2/2014 | Launay et al. |
| 2014/0054021 A1* | 2/2014 | Xing .................. F28F 9/00 165/185 |
| 2018/0100773 A1* | 4/2018 | Guo .................. G01K 11/3206 |

FOREIGN PATENT DOCUMENTS

| | | |
|---|---|---|
| CN | 1202964 A | 12/1998 |
| CN | 102822645 A | 12/2012 |
| CN | 103492842 A | 1/2014 |
| CN | 103907008 A | 7/2014 |
| CN | 107076584 A | 8/2017 |
| CN | 105940286 B | 8/2019 |
| EP | 1096273 A2 | 5/2001 |
| WO | 2017043968 A1 | 3/2017 |

OTHER PUBLICATIONS

Dantas Neto et al.; "Determination of Wax Appearance Temperature (WAT) in Parafinn/ Solvent Systems by Photoelectric Signal and Viscosimetry,"; Brazilian Journal of Petroleum and Gas, vol. 3, No. 4; Oct. 1, 2009; pp. 149-157, XP055274743.
English abstract of CN1202964; retrieved from www.espacenet.com on Oct. 25, 2019.
English abstract of CN1111391; retrieved from www.espacenet.com on Oct. 25, 2019.
English abstract of CN107076584; retrieved from www.espacenet.com on Oct. 25, 2019.
English abstract of CN105940286; retrieved from www.espacenet.com on Oct. 25, 2019.
English abstract of CN103907008; retrieved from www.espacenet.com on Oct. 25, 2019.
English abstract of CN103492842; retrieved from www.espacenet.com on Oct. 25, 2019.
English abstract of CN102822645; retrieved from www.espacenet.com on Oct. 25, 2019.

\* cited by examiner

OPTICAL SENSOR DEVICE WITH ENHANCED SHOCK ABSORPTION

CROSS-REFERENCE TO RELATED APPLICATIONS

This application is a national stage application of International Application No. PCT/NL2016/050621, which was filed on Sep. 7, 2016, which claims priority to Netherlands Application Number 2015406 filed on Sep. 7, 2015, of which is incorporated by reference in its entirety.

OBJECT OF THE INVENTION

The present invention relates to an optical sensor device with enhanced shock-absorption characteristics. In particular, the present invention relates to an optical strain-based sensor that comprises either a pressure-responsive or a thermally-responsive shock absorption mechanism.

BACKGROUND OF THE INVENTION

It is known from prior art various configurations and types of sensors based on the strain applied to an optical fiber. Amongst such types of sensors, the most popular physical properties that are measured are temperature, pressure and acceleration and the most popular type of strain-based sensors are FBG (Fiber Bragg Grating) based sensors.

Optical sensing is an increasingly used technology given its non-dependence on electrical signals and the possibility of including several types of sensors in a single fiber. Also, for harsh environments, such as oil wells, fiber optics provides advantages of high temperature and pressure operation range, low electromagnetic interference pick-up, high signal to noise characteristics and high number of sensors communicating with minimum size and number of cables.

In case of strain-based fiber optic sensing, one of the conditions that have to be considered while designing a sensor is the fact the strain is limited to a several μm and that, once those few μm are exceeded is relatively easy to break the fiber, which implies that the whole optical fiber has to be replaced and re-installed. This is especially challenging in accelerometers (or motion detectors) whereby the need for high precision often results in relatively large moving parts whose miniscule motion is transmitted to form a force stretching of the sensitive region of the optical fiber. In such sensors, shocks and large accelerations result in potentially destructive forces on the joints in the transmission mechanisms, on the (fiber) connection points and the fiber itself.

Therefore, in prior art there have been several mechanisms designed to avoid this over-straining of the fiber, one of such mechanisms involves the use of stoppers to prevent the fiber from overstretching, however, this stoppers require a very precise positioning down to few μm even sub-μm level which is hard to achieve in component manufacturing and assembly, resulting in relatively expensive systems. Furthermore, the manufactured gaps and tolerances for such stoppers will then have to remain stable even under very high pressure values, requiring very rigid housing designs.

Another solution known from prior art is to increase the hardness of the casings of the sensors by using harder materials for their construction or increasing their mass. However, this solution is no ideal because it will increase the overall mass of the sensor, making it harder to use in some environments. This solution also has the disadvantage that it only solves the casing damage issue and would not solve the problem of damage of the internal parts of the sensor.

Under some environmental conditions such as, for example, down-hole operations in the oil and gas industry, it is required that a sensor is capable of withstanding shocks with very high magnitudes from 100-1500 g-force * mass (14715*m [N], being m the mass of the sensor expressed in kilograms) while they are being installed i.e., before their operation starts. Also, such sensors must withstand, during operation, pressures of around 100-2100 bar (10-210 MPa) and temperatures up to around 300 degrees Celsius.

The submicron machining precision required is hardly achievable for the use of stoppers and, under forces of 1500 g-force * mass it may not be enough to maintain the integrity of other moving parts within the sensors. Also, increasing the hardness and the mass of the sensor to withstand such conditions would lead to sensors being too big to be used. Therefore, it is concluded that prior art sensors cannot meet the requirements of the challenging conditions of down-hole operations.

In most cases, however, the main issues on system failure due to high shocks is often during handling, transportation, preparations in the field and installation of the equipment. During this time, it is often the case that the equipment remains at temperatures well below its operation temperature. As such, it is essentially that the shock protection is at its best during the relatively low temperatures whereas the moving parts of the sensor are free to function with minimal resistance at the elevated operation temperatures.

DESCRIPTION OF THE INVENTION

The present invention overcomes the problems of prior art devices by using either a pressure-responsive or temperature-responsive shock absorption mechanism. This mechanism would allow for the sensor to have a high degree of protection by substantially impeding the straining of a fiber when the sensor is in a lower-temperature environment, and allowing the straining of the fiber in a higher-temperature environment.

In particular, the present invention discloses an optical sensor device, comprising:
   an optical fiber;
   a transducer; and
   an intrinsic fiber optic sensor embedded in the optical fiber;
wherein the transducer is arranged as to receive an input action and converting such input action into a proportional strain on the intrinsic fiber optic sensor being at least the transducer and the intrinsic fiber optic sensor enclosed by a housing. In the present invention, the housing is filled either with a thermally-responsive substance or a pressure-responsive substance being such device characterized in that the substance is a substance whose viscosity is reduced by at least 70% upon the change from ambient conditions to working conditions.

By ambient and working conditions it should be understood that the optical sensor of the present invention is meant to be installed in a working facility wherein, in operation, the physical conditions to which the sensor is exposed are different to those of the ambient conditions that the sensor experiments, e.g., while it is being installed or transported.

In a preferred embodiment, the working conditions include a temperature over 200 Celsius degrees (° C.) and/or a pressure over 10 MPa. By ambient conditions, the standard ambient temperature and pressure (SATP) are considered, i.e., a temperature of 298.15 K (25° C., 77° F.) and a pressure of 100 kPa (1 bar, 14.5 psi, 0.9869 atm)., nonetheless, in particular embodiments the ambient temperature and pressure conditions can be modified as to a particular window of temperatures or pressures, therefore, it should be understood that ambient conditions is a first set of conditions wherein the device is not configured to act, such as, during installation or transportation and working conditions are the conditions wherein the device is configured to perform a measurement.

In a preferred embodiment, the viscosity of the substance is 10000 cP at ambient conditions and under 1000 cP at working conditions.

In an embodiment, the substance has a material phase property transition such that its viscosity is reduced by at least 70% over a temperature range of 100 to 300 Celsius degrees. Alternatively, this window of temperature can be preselected and, by modifying the composition of the substance, making it fit a different window temperature, this is achieved by experimentation.

In an especially preferred embodiment, the fusion point of the substance is between 60-100 degrees Celsius. This is particularly advantageous because, at ambient temperature, the substance remains in a solid state thereby maintaining the fiber and all of the moving parts within the housing (such as the transducer) relatively fixed and, when the device is in a working condition (in this particular case, over 60-100 degrees Celsius) the substance melts and allows for the internal parts of the sensor to move, thereby achieving a measurement.

Examples of the substance may be a substance that comprises wax, paraffin, oils, gels, glycerin, silicone or a combination between two or more of them.

As mentioned before, the substance may be manufactured for each particular case by modifying its components. In particular, the substance is a mixture of materials prepared such that the substance has a viscosity change of at least 70% in a preselected temperature and/or pressure window wherein this temperature and/or pressure window can be adapted for each particular case.

The present invention is especially advantageous wherein the sensor is an accelerometer given that this sensor is the one most susceptible to fiber breaking due to over tensions caused by shocks, especially, during its installation. Nonetheless it is also useful in the case of pressure sensors, temperature sensors and/or flow sensors.

Additionally, the present invention can be incorporated in a sensor cable system for seismic measurements, especially downhole seismic sensor by using an optical sensor device as disclosed herein.

DESCRIPTION OF THE DRAWINGS

To complement the description being made and in order to aid towards a better understanding of the characteristics of the invention, in accordance with a preferred example of practical embodiment thereof, a set of drawings is attached as an integral part of said description wherein, with illustrative and non-limiting character, the following has been represented:

FIG. 1 shows an example of optical sensor according to the present invention. In this figure it is shown an optical sensor -1- comprising a fiber optic -2- with a first fiber optic portion -3- and a second fiber optic portion -4- attached to a housing -6-. Such fiber optic -2- comprises a strain sensitive portion -5-, that can be, for example, an FBG.

So that this embodiment is able to sense a physical parameter, the housing -6- is attached to the fiber -2- on its first fiber optic portion -3- and its second fiber optic portion -4-, for example, by clamping and/or gluing. In this particular embodiment, the housing -6- acts as a sensing body and, therefore, its size is responsive to the physical property to be measured. For example, to measure pressure, the housing can be made of a material that contracts and expands with increasing or decreasing pressure. Therefore, length variations of the housing -6- will be transformed to length variations of the fiber -2-, particularly, on its strain sensitive portion -5-.

One of the main disadvantages of this exemplary embodiment of optical sensor -1- would be that an increase in the pressure, for example, due to a shock of the sensor during its installation may cause the fiber to overstrain and, subsequently, break. Therefore, the present invention envisages the use of a filling substance -7- on the housing, having such filling substance a determined behavior at ambient conditions and another behavior at working conditions. Such behavior can be, for example, an increased viscosity at ambient conditions and a decreased viscosity at working conditions.

In the clearest example, the filling substance -7- is solid at ambient conditions, for example, it can be paraffin or wax. Being the substance -7- solid at ambient conditions the strain sensitive portion -5- of the fiber is more unlikely to be susceptible to some shocks given that it would be protected by the filling substance -7-. One the optical sensor -1- is installed and on working conditions, the substance -7- lowers its viscosity or, in the case of paraffin or wax, it will melt and allow for the strain-sensitive portion of the fiber to strain and, therefore, to perform a measurement.

Figure 1A:
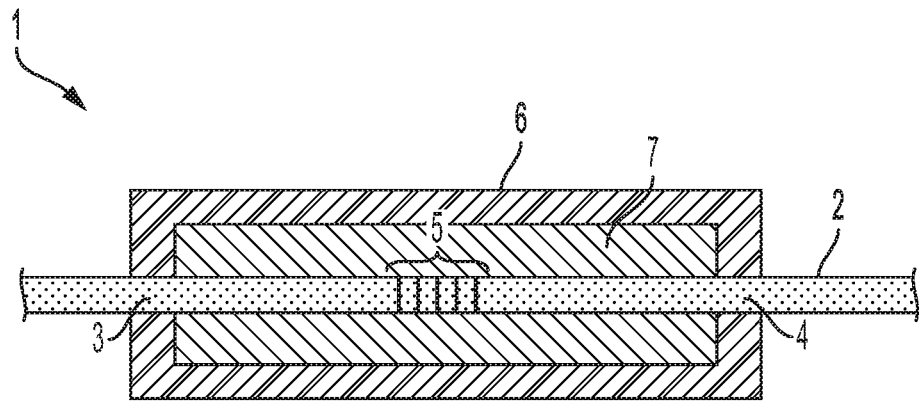
FIGS. 1A and 1B show embodiments of an optical sensor according to the present invention
Figure 1B:
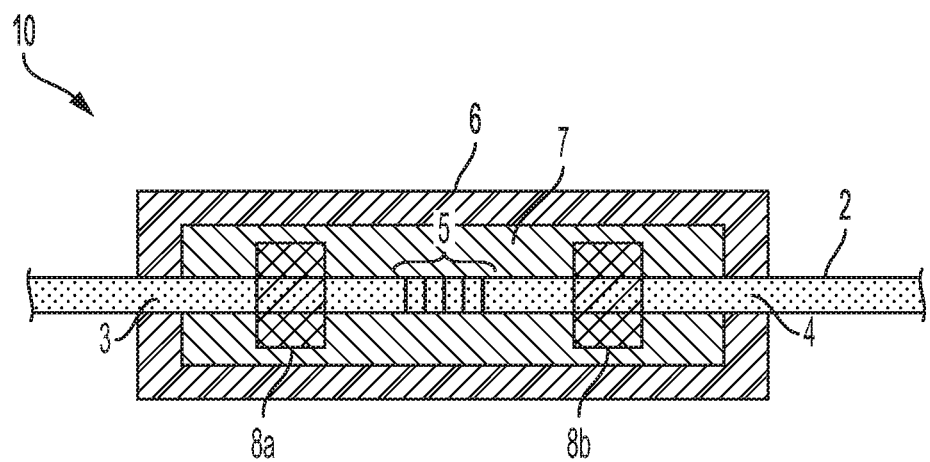

Another example, shown in FIG. 1B, of sensor -10- would be of the type incorporating a transducer (-8a- and -8b-)in the inner portion of the housing being the housing rigid and the transducer disposed to change the strain on the strain sensitive portion -5- in view of a determined physical property, such as, pressure, acceleration, temperature, flow, etc. In this case, not only the strain-sensitive portion -5- of the fiber -2- is likely to be damaged, but also the internal parts such as transducers, transmission arms, or others. Therefore, the filling substance protects both, the transducing elements and the fiber -2-.

Figure 2:
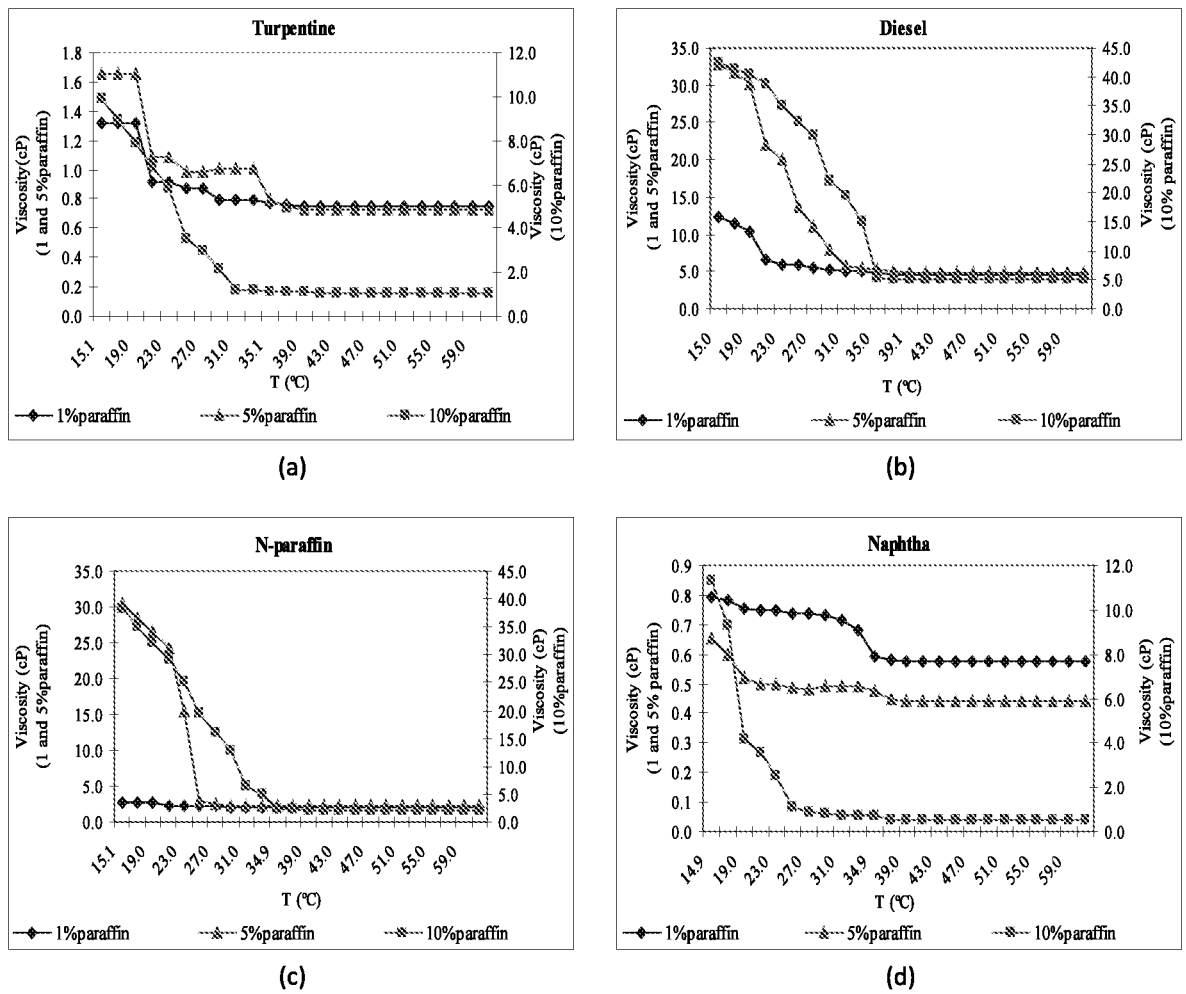
FIG. 2 shows four graphs of exemplary substances indicating their change of viscosity at various temperatures.

FIG. 2 shows different substances that have been combined to achieve a determined viscosity for a particular application. These substances are to be understood as being merely exemplary as the concentration and/or their composition can easily be modified through experimentation to achieve a determined viscosity at a determined temperature window.

In particular, FIG. 2 shows combinations of oil with different concentrations of paraffin. These graphs correspond to experiments disclosed in the Brazilian journal of petroleum and gas, v. 3 n. 4, p. 149-157, 2009, ISSN 1982-0593. In this document substances with different viscosities are studied but not for the particular purpose of the present invention.

In a first example of substance, FIG. 2(a) discloses the use of turpentine with paraffin concentrations of 1%, 5% and 10%. In this case, it seems clear that with a 1% concentration of paraffin the substance achieves a viscosity of around 1.3 cP at 15° C., this viscosity increases to over 1.6 when the paraffin concentration is increased to a 5%. Both of these options are a good option when an increased viscosity is needed around 15° C. to 20° C. and a lower viscosity is needed over 30° C. where these substances have a substantially linear behavior around 0.7 cP. When the paraffin concentration is modified to 10% the behavior of the substance is modified to a viscosity of around 10 cP at 15° C. and a linear behavior of 1 cP when the temperature is over 31° C. Therefore, it is clear that in this case it would be advantageous to use this substance as filler of the housing of a sensor wherein the sensor is to be on an installation or ambient condition of around 15° C. to 20° C. and working conditions over 30° C. given that the substance would restrict the movement of moving parts and possible overstraining of a fiber below 20° C. and would cause less restriction of such movements in working conditions, i.e., on temperatures over 30° C.

In a second example, FIG. 2(b) envisages the use of diesel with paraffin at concentrations of 1%, 5%, and 10%. In this case, a similar behavior as in FIG. 2(a) was observed with the particularity that higher viscosity was reached at both, ambient conditions and working conditions. In this case, the ambient condition for 5% and 10% concentrations can be temperatures below 25° C. and working conditions temperatures over 30° C., nonetheless for the 1% concentration with a temperature of around 20° C. the viscosity drops from 13 cP at 15° C. to 5 cP, therefore, the working condition for this concentration should be around 20° C.

In a third example of substance, FIG. 2(c) envisages the use of N-paraffin with paraffin concentrations of 1%, 5% and 10%. In particular, this example shows that a 1% concentration of paraffin does not change substantially the viscosity at different temperatures and would be, therefore, non-beneficial as a substance for filling the housing of the present invention. Once the concentration is increased to 5% and 10% the effect pursued of having a higher viscosity while on ambient temperature is achieved, in this case, the effect is very similar in both concentration with a slightly better behavior of the 5% paraffin concentration given that it has a smaller transition window between ambient temperature and working temperature.

Finally, in a fourth example of substance, FIG. 2(d) shows the use of naphta with concentrations of 1%, 5% and 10% of paraffin. It seems clear that, by using naphta, a lower ambient temperature is required since the viscosity starts reducing dramatically from a temperature around 19° C., also, for concentrations of 1% and 5% it is observed that the behavior on temperatures over 23° C. changes and is not as linear as in the case of the 10% concentration case. Therefore, it seems clear that it can be useful to characterize the behavior of the substance at all of the possible working temperatures and include a temperature sensor in the proximity of the optical sensor according to the present invention so that the viscosity can be indirectly determined in all possible cases and the measurements can be corrected according to each temperature.

It should be understood that these substances are a mere example in order to show that different substances can achieve different behaviors that can be adapted to modify the ambient temperature/pressure to a determined windows and the working conditions to a different window. The present invention should be understood in its broadest sense wherein the substance to be used is a substance with a higher viscosity at a determined pressure and/or temperature windows (the ambient conditions) and a lower viscosity at a determined pressure and/or temperature conditions (the working conditions). In a preferred embodiment the viscosity of the substance has been previously characterized so that the viscosity at, at least, the working conditions and the ambient conditions is known and a temperature sensor is included so that the measurements can be corrected according to the temperature measured by the temperature sensor.

The invention claimed is:

1. An optical sensor device, comprising:
   an optical fiber with an intrinsic fiber optic sensor embedded therein;
   a transducer configured to receive an input action and convert the input action into a proportional strain on the intrinsic fiber optic sensor embedded in the optical fiber; and
   a housing configured to enclose the intrinsic fiber optic sensor and the transducer and being
   filled either with a thermally-responsive substance or a pressure-responsive substance, wherein viscosity of the thermally-responsive substance or the pressure-responsive substance is reduced by at least 70% upon the change from ambient conditions to working conditions.

2. The optical sensor device according to claim 1, wherein the working conditions include a temperature over 200 Celsius degrees.

3. The optical sensor device according to claim 1, wherein the working conditions include a pressure over 10 MPa.

4. The optical sensor device according to claim 1, wherein the ambient conditions include: a temperature of 25 Celsius degrees, and/or a pressure of 100 kPa.

5. The optical sensor device according to claim 1, wherein the thermally-responsive substance or the pressure-responsive substance has a material phase property transition such that its viscosity is reduced by at least 70% over a temperature range of 20 to 200 Celsius degrees.

6. The optical sensor device according to claim 1, wherein the viscosity of the thermally-responsive substance or the pressure-responsive substance is over 10000 cP at ambient conditions and under 1000 cP at working conditions.

7. The optical sensor device according to claim 1, wherein a fusion point of the thermally-responsive substance or the pressure-responsive substance is between 60-100 degrees Celsius.

8. The optical sensor device according to claim 1, wherein the thermally-responsive substance or the pressure-responsive substance comprises wax, paraffin, oils, gels, glycerin, silicone or a combination between two or more of them.

9. The optical sensor device according to claim 1, wherein the thermally-responsive substance or the pressure-responsive substance is a mixture of materials prepared such that the thermally-responsive substance or the pressure-responsive substance has a viscosity change of at least 70% in a determined temperature window.

10. The optical sensor device according to claim 1, wherein the thermally-responsive substance or the pressure-responsive substance is a mixture of materials prepared such that the thermally-responsive substance or the pressure-responsive substance has a viscosity change of at least 70% in a determined pressure window.

11. The optical sensor device according to claim 1, wherein the intrinsic fiber optic sensor is an accelerometer.

12. The optical sensor device according to claim 1, wherein the intrinsic fiber optic sensor is selected from the group comprising: pressure sensors, temperature sensors or flow sensors.

13. A sensor cable system for seismic measurements comprising:
   an optical sensor device comprising:
      an optical fiber with an intrinsic fiber optic sensor embedded therein;

a transducer configured to receive an input action and convert the input action into a proportional strain on the intrinsic fiber optic sensor embedded in the optical fiber; and a housing configured to enclose the intrinsic fiber optic sensor and the transducer and being filled with a substance, wherein viscosity the substance is reduced by at least 70% upon the change from ambient conditions to working conditions.

14. The sensor cable system according to claim 13, wherein the substance is a thermally-responsive substance.

15. The sensor cable system according to claim 14, wherein the thermally-responsive substance has a material phase property transition such that the viscosity is reduced by at least 70% over a temperature range of 20 to 200 Celsius degrees.

16. The sensor cable system according to claim 14, wherein a fusion point of the thermally-responsive substance is between 60-100 degrees Celsius.

17. The sensor cable system according to claim 13, wherein the substance is a pressure-responsive substance.

18. The sensor cable system according to claim 17, wherein the viscosity of the pressure-responsive substance is over 10000 cP at ambient conditions and under 1000 cP at working conditions.

19. The sensor cable system according to claim 13, wherein the working conditions include a temperature over 200 Celsius degrees.

20. The sensor cable system according to claim 13, wherein the working conditions include a pressure over 10 MPa.

* * * * *